US008095262B2

(12) United States Patent
Ban et al.

(10) Patent No.: US 8,095,262 B2
(45) Date of Patent: Jan. 10, 2012

(54) VEHICULAR CONTROL APPARATUS AND PROGRAM STORAGE MEDIUM

(75) Inventors: Yoshinori Ban, Anjo (JP); Kokichi Shimizu, Kariya (JP); Masayoshi Kondoh, Chiryu (JP)

(73) Assignee: Denso Corporation, Kariya (JP)

( * ) Notice: Subject to any disclaimer, the term of this patent is extended or adjusted under 35 U.S.C. 154(b) by 672 days.

(21) Appl. No.: 12/244,314

(22) Filed: Oct. 2, 2008

(65) Prior Publication Data

US 2009/0088923 A1 Apr. 2, 2009

(30) Foreign Application Priority Data

Oct. 2, 2007 (JP) ................................ 2007-258822

(51) Int. Cl.
*G01M 17/00* (2006.01)

(52) U.S. Cl. ............................... 701/31; 701/33; 701/35

(58) Field of Classification Search .................... 701/31, 701/29, 114, 115, 33, 34, 35; 340/438, 439; *G01M 17/00*
See application file for complete search history.

(56) References Cited

U.S. PATENT DOCUMENTS

| | | | | |
|---|---|---|---|---|
| 5,021,764 | A | 6/1991 | Mabee | |
| 5,668,726 | A * | 9/1997 | Kondo et al. | 701/115 |
| 6,615,119 | B1 | 9/2003 | Shimizu | |
| 2003/0060953 | A1 | 3/2003 | Chen | |
| 2005/0065679 | A1 | 3/2005 | Kawauchi et al. | |
| 2005/0119809 | A1 | 6/2005 | Chen | |
| 2007/0180318 | A1 | 8/2007 | Morozumi | |

FOREIGN PATENT DOCUMENTS

| | | |
|---|---|---|
| JP | 5-79397 | 3/1993 |
| JP | 6-149683 | 5/1994 |
| JP | 7-77101 | 3/1995 |
| JP | 11-316177 | 11/1999 |
| JP | 2002-334024 | 11/2002 |
| JP | 2006-226805 | 8/2006 |

OTHER PUBLICATIONS

Extended European Search Report dated Feb. 18, 2009, issued in corresponding European Application No. 08017315.6-2211.
Japanese Office Action dated Sep. 15, 2009, issued in corresponding Japanese Application No. 2007-258822, with English translation.
Title 13, California Code Regulations, Section 1968.2, Malfunction and Diagnostic System Requirements for 2004 and Subsequent Model-Year Passenger Cars, Light-Duty Trucks, and Medium-Duty Vehicles and Engines (OBDII), 141 total pages, no date.

* cited by examiner

*Primary Examiner* — Eric Culbreth
*Assistant Examiner* — Keith Frisby
(74) *Attorney, Agent, or Firm* — Nixon & Vanderhye P.C.

(57) ABSTRACT

Whether an anomaly occurs in a data-rewritable second nonvolatile memory is determined by comparison between (i) a diagnosis code stored in the second nonvolatile memory and (ii) data contents stored as a diagnosis table in a first nonvolatile memory. The first nonvolatile memory previously stores the diagnosis table for listing diagnosis codes. If the diagnosis codes are appropriately registered in the diagnosis table, it is thereafter unnecessary to take into consideration whether the diagnosis codes are normally stored in the first nonvolatile memory. This configuration requires no further rewriting of information in the first nonvolatile memory unlike other memories, and thus decreases a possibility of an occurrence of an anomaly to garble the information in the first nonvolatile memory in comparison with other memories. Whether an anomaly occurs in the second nonvolatile memory can be thus performed more appropriately.

12 Claims, 3 Drawing Sheets

| DIAGNOSIS CODE | EVENT |
|---|---|
| 0000 | NO CODE AVAILABLE |
| ... | ... |
| 0111 | OUTSIDE RANGE OF INTAKE TEMP. SENSOR |
| 0112 | SHORT CIRCUIT OF INTAKE TEMP. SENSOR |
| 0113 | DISCONNECTION OF INTAKE TEMP. SENSOR |
| 0116 | OUTSIDE RANGE OF WATER TEMP. SENSOR |
| 0117 | SHORT CIRCUIT OF WATER TEMP. SENSOR |
| 0118 | DISCONNECTION OF WATER TEMP. SENSOR |
| ... | ... |

VEHICULAR CONTROL APPARATUS AND PROGRAM STORAGE MEDIUM

CROSS REFERENCE TO RELATED APPLICATION

This application is based on and incorporates herein by reference Japanese Patent Application No. 2007-258822 filed on Oct. 2, 2007.

FIELD OF THE INVENTION

The present invention relates to a vehicular control apparatus to determine an occurrence of an anomaly in a rewritable nonvolatile memory, which is used for storing a diagnosis code corresponding to an event occurs in a process in which a predetermined control unit controls an operation of a control target.

BACKGROUND OF THE INVENTION

Patent document 1 proposes such a vehicular control apparatus, which writes data in a volatile memory (RAM) as well as to a nonvolatile memory (EEPROM), and determines an occurrence of an anomaly when both data do not accord with each other.

The above technology, however, presupposes that data writing to the volatile memory is successfully completed. If writing is not executed normally, or if written data is changed in the volatile memory, an anomaly occurring in the nonvolatile memory cannot be determined appropriately.

Patent document 1: JP-H05-79397 A

SUMMARY OF THE INVENTION

It is an object to determine more appropriately whether an anomaly occurs in a nonvolatile memory.

According to an example of the present invention, an vehicular control apparatus is provided as follows. The apparatus uses (i) a first memory of a nonvolatile memory for storing a plurality of diagnosis codes and (ii) a second memory of a nonvolatile memory in which data are deletable or rewritable. A diagnosis code among the plurality of diagnosis codes stored in the first memory is stored in the second memory in response to an event occurring in a process in which a predetermined control unit controls an operation of a control target. The diagnosis code stored in the second memory corresponds to the event occurring in the process. A first accordance determination is performed as to whether or not a not-according diagnosis code is present in the second memory. The not-according diagnosis code is stored in the second memory and not according with any one of the plurality of diagnosis codes stored in the first memory. It is determined that an anomaly occurs in the second memory when the not-according diagnosis code is present in the second memory.

As another example of the present invention, a program storage medium is provided as containing instructions readable and executable by a computer. The instructions are for causing the computer to function as all the means included in the above vehicular control apparatus.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Hereafter, description will be given to an embodiment of the present invention with reference to the drawings.

(1) Configuration and Basic Operation

Figure 1:
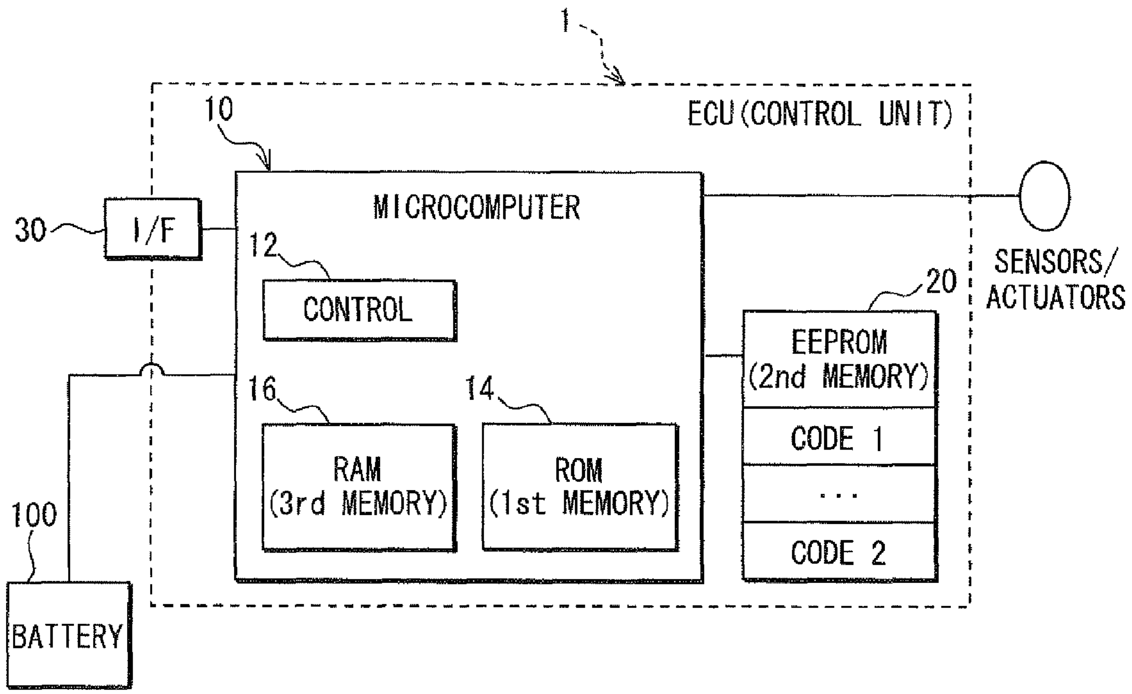
FIG. 1 is a block diagram illustrating a configuration of a control apparatus according to an embodiment of the present invention.

A vehicle control apparatus may be provided as a part of a control unit (ECU: Electronic Control Unit) 1 which controls operations of a predetermined control target via various sensors or actuators. As illustrated in FIG. 1, the control unit 1 includes a microcomputer 10 which controls an overall operation of the control unit 1, a recordable nonvolatile memory (e.g., EEPROM: Electrically Erasable Programmable ROM) 20 in which data can be re-written and deleted (i.e., data-rewritable and data-deletable); and an input/output interface 30.

The present embodiment exemplifies a configuration in which the control unit 1 controls an operation of a subject vehicle as a control target by operating actuators based on detection results from the various sensors. The microcomputer 10 contains a control section 12 which executes various processes, a nonvolatile memory (e.g., ROM) 14 which stores multiple diagnosis codes mentioned later and the various programs, and a volatile memory (e.g., RAM as a backup memory) 16 which can retain memory contents by receiving power supply from a battery 100.

The input/output interface 30 is coupled with an external tool, which is used for reading a diagnosis code stored in the nonvolatile memory 20 or the volatile memory 16 via the microcomputer 10.

Hereinafter, the nonvolatile memory 14 of the microcomputer 10 as a first memory is called ROM 14; the recordable nonvolatile memory 20 as a second memory is called EEPROM 20; and the volatile memory 16 of the microcomputer 10 as a third memory is called RAM 16.

(2) Process by Microcomputer 10

Explanation is made to various processes by the control section 12 of the microcomputer 10 to run according to a program stored in the ROM 14.

(2-1) Diagnosis Code Storing Process

A diagnosis code storing process is explained with reference to FIG. 2. The diagnosis code storing process starts when it is determined that a predetermined anomaly as an event has occurred in a control target or the ECU 1 based on detection results from the various sensors.

Figures 3, 4:
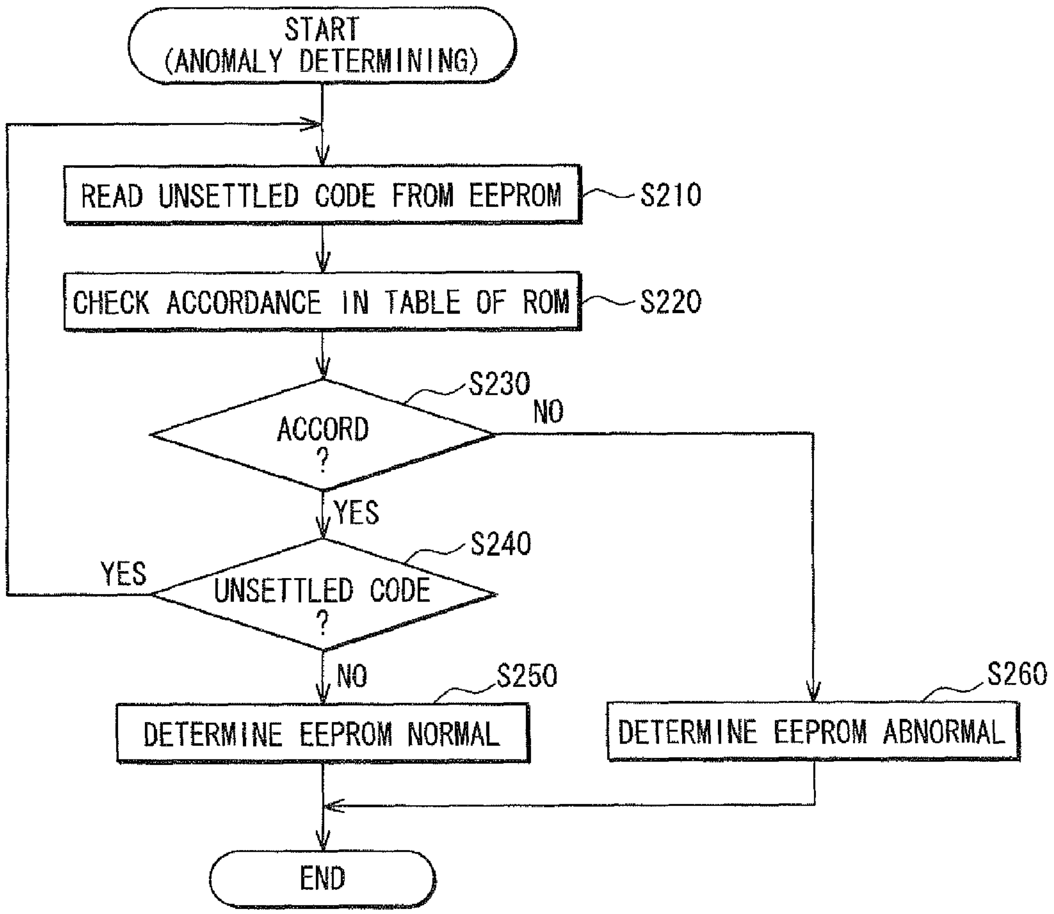
FIG. 3 is a diagram illustrating a data structure of a diagnosis table.
FIG. 4 is a flowchart illustrating a first anomaly determination process.

When the diagnosis code storing process is started, a diagnosis code corresponding to the anomaly having occurred prior to the start is designated based on the diagnosis table stored in the ROM 14 at S110. As illustrated in FIG. 3, a diagnosis table contains (i) an anomaly assumed to take place in the control target or ECU 1, and (ii) a corresponding diagnosis code, as registered data in association with each other. Based on the diagnosis table, the control section 12 designates a diagnosis code corresponding to the anomaly having occurred prior to the start of the diagnosis code storing process. Although multiple diagnosis codes are collectively registered or stored in the diagnosis table in the above embodiment, individual diagnosis codes need not be collected in the diagnosis table. For example, each diagnosis code of the multiple diagnosis codes may be associated with an anomaly assumed to take place in the control target or ECU 1; the individual diagnosis codes may be stored in more than one memory. Then, a relevant diagnosis code can be designated among the diagnosis codes individually stored in the more than one memory.

Next, the diagnosis code designated at S110 is stored in a storage area for diagnosis codes of the RAM 16 at S120. Then, the diagnosis code designated at S110 is stored in a storage area for diagnosis codes of the EEPROM 20 at S130.

(2-2) Anomaly Determination Process

An anomaly determination process is started at a predetermined interval after the start of the microcomputer 10. The anomaly determination process is explained with reference to FIG. 4. The anomaly determination process is started at least one time point among the following (a)-(e). To determine the above time point, it should be considered that an access to the EEPROM 20 generally requires an unignorable time period. Thus, it is desirable to designate at least one time point so as not to cause an excessive load against a vehicular control process.

(a) Time point when a diagnosis code stored in the EEPROM 20 is reproduced to the RAM 16, (b) Time point when a diagnosis code in the EEPROM 20 or RAM 16 is read out in response to an access from an external tool, (c) Time point when the control unit 1 starts, (d) Time point when a specified time period elapses after the control unit 1 starts, and (e) Time point when the control unit 1 stops or a specified time point prior to the stop of the control unit 1.

Herein, the time point (a) corresponds to the following. It is assumed that a diagnosis code is stored in the RAM 16 and EEPROM 20 individually. Then a certain dominant cause takes place. For example, the battery 100 is removed to thereby interrupt the power supply to the RAM 16 temporarily. In such a case, it is detected that the diagnosis code stored in the RAM 16 becomes abnormal or erased and a diagnosis code stored in the EEPROM 20 is thereby duplicated or reproduced to the RAM 16. Such a time point for data duplication is defined as the above time point (a).

After the start of the anomaly determination process, any unsettled diagnosis code is read out from the EEPROM 20 at S210. The unsettled diagnosis code signifies a diagnosis code which has not been referred to so far at the following processing. Next, it is checked at S220 whether the diagnosis code read at S210 accords with any one of the diagnosis codes registered in the diagnosis table in the ROM 14.

When it is determined that the diagnosis code read at S210 accords with one of the diagnosis codes registered in the diagnosis table according to a result of the check (S230: YES), it is checked whether another unsettled diagnosis code remains in the EEPROM 20 at S240.

When it is determined that the unsettled diagnosis code remains in the EEPROM 20 (S240: YES), the processing returns to S210. In contrast, when it is determined that any unsettled diagnosis code does not remain in the EEPROM 20 (S240: NO), it is determined that the EEPROM 20 is normal at S250. The present anomaly determination process is then ended.

Further, when it is determined that the diagnosis code read at S210 does not accord with any one of the diagnosis codes registered in the diagnosis table according to a result of the check (S230: NO), it is determined that the EEPROM 20 is abnormal at S260. The present anomaly determination process is then ended.

Figure 5:
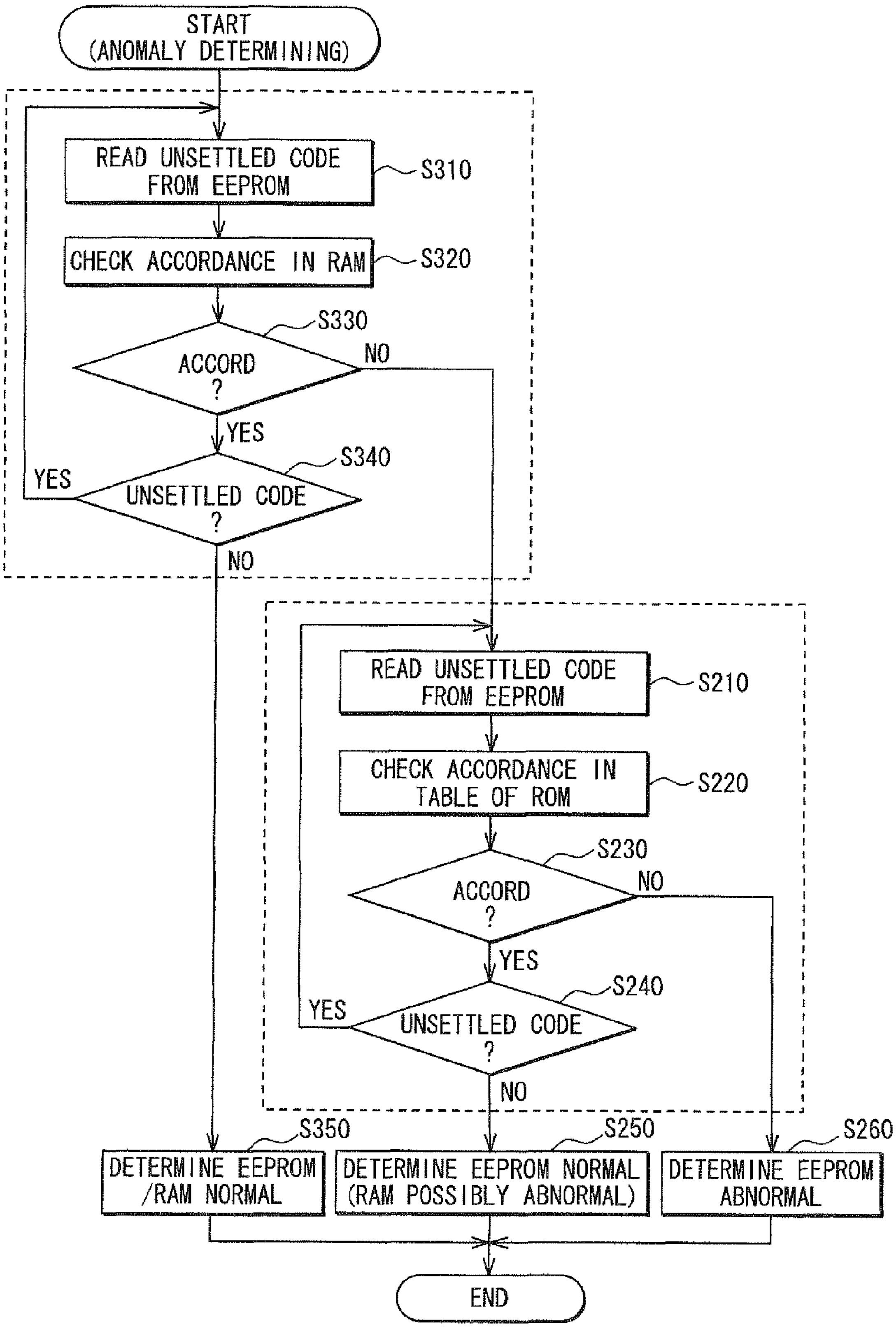
FIG. 5 is a flowchart illustrating a second anomaly determination process.

In addition, the anomaly determination process may be modified as illustrated in FIG. 5; namely, other processing such as S310 to S350 may be added before executing the above S210. After the start of the anomaly determination process, any unsettled diagnosis code is read out from the EEPROM 20 at S310 like at S210.

Next, it is checked at S320 whether the diagnosis code read at S310 accords with any one of the diagnosis codes stored in a storage area for diagnosis codes in the RAM 16.

When it is determined that the diagnosis code read at S310 accords with one of the diagnosis codes stored in the storage area for diagnosis codes in the RAM 16 according to a result of the check (S330: YES), it is checked whether another unsettled diagnosis code remains in the EEPROM 20 at S340.

When it is determined that an unsettled diagnosis code remains in the EEPROM 20 (S340: YES), the processing returns to S310. In contrast, when it is determined that any unsettled diagnosis code does not remain in the EEPROM 20 (S340: NO), it is determined that the EEPROM 20 and the RAM 16 are normal at S350.

The present anomaly determination process is then ended.

When it is determined that the diagnosis code read at S310 does not accord with one of the diagnosis codes stored in the storage area for diagnosis codes according to a result of the check (S330: NO), the processing advances to above S210.

Subsequently, S210 to S260 are executed in a similar manner. Further, at S250, it is determined that an anomaly may occur in the RAM 16.

(3) Operation and Effect

Under the above configuration, whether an anomaly occurs in the EEPROM 20 of a recordable nonvolatile memory is determined by comparison between a diagnosis code recorded in the EEPROM 20 and the recorded content in the ROM 14 storing the multiple diagnosis codes as a diagnosis table.

Herein, the ROM 14 is designed as a nonvolatile memory previously storing the diagnosis table. If the diagnosis codes are appropriately registered in the table, it is thereafter unnecessary to take into consideration whether the diagnosis codes are recorded normally.

Unlike the EEPROM 20 of a recordable nonvolatile memory or RAM 16 of a volatile memory, the ROM 14 can be designed as undergoing no additional data rewriting. Thus, the ROM 14 has less possibility of an occurrence of an anomaly to garble recorded information in comparison with the EEPROM 20 or RAM 16.

It is therefore almost unnecessary to take into consideration whether the diagnosis codes are recorded normally in the ROM 14. This results in that the comparison can be performed against the recorded contents of the ROM 14, which have significantly less possibility that the diagnosis codes change. Thus whether an anomaly occurs in the EEPROM 20 can be more appropriately than before.

In addition, the configuration, which includes S310 to S350 immediately after the start of the anomaly determination process, allows whether an anomaly occurs in the EEPROM 20 to be performed under the following condition: it has been determined that a diagnosis code stored in the EEPROM 20 does not accord with any one of the diagnosis codes stored in the RAM 16.

In addition, the determination according to S210 to S260 of FIG. 5 in the above embodiment is performed under the condition that it has been determined that a diagnosis code stored in the EEPROM 20 does not accord with any one of the diagnosis codes stored in the RAM 16 (S330: NO). In other words, only when it has been determined that a diagnosis code stored in the EEPROM 20 does not accord with any one of the diagnosis codes stored in the RAM 16, the determination according to S210 to S260 can be executed.

The state, in which a not-according diagnosis code is present, presumes that either the RAM 16 or EEPROM 20 has undergone an anomaly. In contrast, the state, in which a not-according diagnosis code is not present, presumes that neither the RAM 16 nor EEPROM 20 has undergone any anomaly. In the latter state, it is not necessary to execute the determination according to S210 to S260 any more.

In other words, the preliminary determination as to whether a diagnosis code stored in the EEPROM 20 accords with any one of the diagnosis codes stored in the RAM 16 can contribute to easing the processing load about whether an anomaly occurs in the EEPROM 20.

The RAM 16 stores only a diagnosis code which is recorded in the diagnosis code storing process. Thus, the more the ROM 14 stores diagnosis codes, the relatively fewer the RAM 16 stores diagnosis codes than the ROM 14 does.

Thus, whether a diagnosis code stored in the EEPROM 20 accords with any one of the diagnosis codes stored in the RAM 16 requires less processing time because of fewer population parameters of comparison targets, in comparison with the determination according to S210 to S260 of FIG. 5 in relation with the ROM 14.

When it is determined that a not-according diagnosis code is not present, it is not necessary to execute the processing accompanying the determination according to S210 to S260 of FIG. 5. This can contribute to easing the processing burden about whether an anomaly occurs in the EEPROM 20.

Further, in the above embodiment, the anomaly determination process to determine whether an anomaly occurs in the EEPROM 20 is started at any one of the following time points: each time an access to the RAM 16 occurs, each cycle from the start to the stop of an operation of the control unit 1, each time an access to the control unit 1 from an external tool occurs, and a time point coming periodically.

(4) Modification

Although the embodiment is described above, the present invention is not limited to the embodiment and can be modified in various manners.

For example, in the above embodiment, a diagnosis code corresponding to an anomaly is stored in the memory, and an anomaly determination process is performed based on the diagnosis code. However, any information which can indicate an anomaly at the time of occurrence of the anomaly may be used for an alternative to the above diagnosis code and stored in the memory. In such a case, it is only necessary to design a configuration in which an anomaly determination process is performed based on the thus stored information.

In addition, the above embodiment may be modified as follows. When a diagnosis code is stored in the EEPROM 20 and RAM 16, it may be stored in mutually corresponding storage areas in the EEPROM 20 and RAM 16. For example, the storage areas are assigned individually with the identical address, or addresses of the storage areas of the EEPROM 20 and RAM 16 are associated with each other. Then, at S320 of the anomaly determination process, only accordance is performed only between the diagnosis code read at S310 and a diagnosis code stored in the corresponding storage area of the RAM 16.

Under the above configuration, the determination as to whether an anomaly occurs in the EEPROM 20 can be performed on the condition that it has been determined that the diagnosis code stored in the EEPROM 20 does not accord with a diagnosis code stored in the RAM 16 at the time of the occurrence of the above anomaly pertinent to the relevant diagnosis code.

(5) Means or Control Portion of Control Unit

Figure 2:
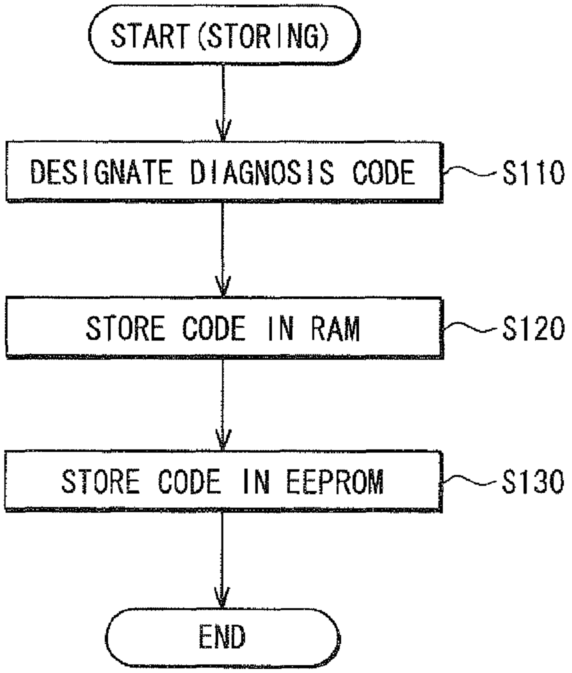
FIG. 2 is a flowchart illustrating a diagnosis code storing process.

In the embodiment described above, the control section 12 may function at S130 in FIG. 2 as a second-memory storing means or control portion; the control section 12 may function at S210 to S240 in FIG. 4 and FIG. 5 as a first accordance determination means or control portion; the control section 12 may function at S250, S260 in FIG. 4 and FIG. 5 and S350 in FIG. 5 as a second-memory anomaly determination means or control portion; the control section 12 may function at S120 in FIG. 2 as a third-memory storing means or control portion, and the control section 12 may function at S310 to S340 in FIG. 5 as a second accordance determination means or control portion.

Each or any combination of processes, steps, or means explained in the above can be achieved as a software portion or unit (e.g., subroutine) and/or a hardware portion or unit (e.g., circuit or integrated circuit), including or not including a function of a related device; furthermore, the hardware portion or unit can be constructed inside of a microcomputer.

Furthermore, the software portion or unit or any combinations of multiple software portions or units can be included in a software program, which can be contained in a computer-readable storage media or can be downloaded and installed in a computer via a communications network.

Aspects of the disclosure described herein are set out in the following clauses.

As an aspect of the disclosure, an vehicular control apparatus is provide as follows. The apparatus uses (i) a first memory of a nonvolatile memory for storing a plurality of diagnosis codes and (ii) a second memory of a nonvolatile memory in which data are deletable or rewritable. A second-memory storing means is configured for storing, in the second memory, a diagnosis code among the plurality of diagnosis codes stored in the first memory, in response to an event occurring in a process in which a predetermined control unit controls an operation of a control target, the diagnosis code stored in the second memory corresponding to the event occurring in the process. A first accordance determination means is configured for performing a first accordance determination as to whether or not a not-according diagnosis code is present in the second memory, the not-according diagnosis code being stored in the second memory by the second-memory storing means and not according with any one of the plurality of diagnosis codes stored in the first memory. A second-memory anomaly determination means is configured for determining that an anomaly occurs in the second memory when the first accordance determination means determines that the not-according diagnosis code is present in the second memory.

Under the above configuration, whether an anomaly occurs in the second memory of a data-rewritable or data-deletable nonvolatile memory is determined by comparison between a diagnosis code stored in the second memory and data contents stored in the first memory.

The first memory is a nonvolatile memory (for example: flash ROM) which stores multiple assumed diagnosis codes beforehand. If the diagnosis codes are appropriately stored in the first memory, it is thereafter unnecessary to take into consideration whether the diagnosis codes are stored normally.

Further, the first memory can be designed as undergoing no further rewriting of stored data unlike the second memory of a data-rewritable or data-deletable nonvolatile memory or a volatile memory. Thus, the first memory has less possibility of an occurrence of an anomaly to garble stored information, in comparison with the other memories within the configuration.

It is therefore almost unnecessary to take into consideration whether the diagnosis codes are recorded normally in the first memory. This results in that the comparison can be performed against the recorded data contents of the first memory, which have significantly less possibility that the stored diagnosis codes change. Thus whether an anomaly occurs in the second memory can be more appropriately determined than before.

As an optional configuration, the vehicular control apparatus may further use a third memory of a volatile memory for retaining data by receiving a power supply. A third-memory storing means may be further configured for storing, in the third memory, a diagnosis code among the plurality of diagnosis codes stored in the first memory, in response to an event occurring in the process, the diagnosis code stored in the third memory corresponding to the event occurring in the process. A second accordance determination means may be further configured for performing a second accordance determination as to whether or not a not-according diagnosis code related with the third memory is present in the second memory, the not-according diagnosis code related with the third memory being stored in the second memory by the second-memory storing means and not according with the diagnosis code stored in the third memory. Herein, when the second accordance determination means determines that the not-according diagnosis code related with the third memory is present in the second memory, the first accordance determination means may be further configured to perform the first accordance determination.

As an optional configuration, the above vehicular control apparatus may further use a third memory of a volatile memory for retaining data by receiving a power supply, wherein the second memory storing means stores a diagnosis code, which corresponds to an event occurring in the process, in a storage area of the second memory and a storage area of the third memory corresponding to the storage area of the second memory. A third accordance determination means may be further configured for performing a third accordance determination as to whether or not a not-according diagnosis code related with the third memory is present in the storage area of the second memory, the not-according diagnosis code related with the third memory being stored in a storage area of the second memory and not according with a diagnosis code stored in a storage area of the third memory corresponding to the storage area of the second memory. Herein, when the third accordance determination means determines that the not-according diagnosis code related with the third memory is present in the storage area of the second memory, the first accordance determination means may be further configured to perform the first accordance determination.

In either of the above two optional configurations, the first accordance determination by the first accordance determination means may be executed on the condition that the diagnosis code stored in the second memory and the diagnosis code stored in the third memory do not accord with each other.

The state, in which a not-according diagnosis code is present, presumes that either the second memory or third memory has undergone an anomaly. In contrast, the state, in which a not-according diagnosis code is not present, presumes that neither the second memory nor third memory has undergone an anomaly. In the latter state, it is unnecessary to execute any more the first accordance determination by the first accordance determination means.

In other words, the preliminary determination as to whether a diagnosis code among the diagnosis codes stored in the second memory accords with any one of the diagnosis codes stored in the third memory can contribute to easing the processing burden about whether an anomaly occurs in the second memory.

The third memory stores only the diagnosis code which the third-memory storing means stores. Thus, the more the first memory stores diagnosis codes, the relatively less the second memory stores diagnosis codes than the first memory.

Thus, whether a diagnosis code stored in the second memory accords with any one of the diagnosis codes stored in the third memory requires less processing time because of fewer population parameters of comparison targets, in comparison with the first accordance determination by the first accordance determination means in relation with the first memory.

When it is determined that a not-according diagnosis code is not present, it is not necessary to execute the processing accompanying the first accordance determination by the first accordance determination means. This can contribute to easing the processing burden about whether an anomaly occurs in the second memory.

Incidentally, the first accordance determination by the first accordance determination means may be performed at any time point. Herein, an access to a data-rewritable or data-deletable nonvolatile memory generally takes time; thus, it is desirable to execute the access only at a specific time point in consideration of the processing load of the vehicular control apparatus.

One example is a time point when the diagnosis code stored in the second memory is duplicated in the third memory.

Thus, as an optional configuration, the above vehicular control apparatus may further use a third memory of a volatile memory for retaining data by receiving a power supply. A third-memory storing means may be configured for storing, in the third memory, a diagnosis code among the plurality of diagnosis codes stored in the first memory, at a predetermined time point in response to an event occurring in the process, the diagnosis code corresponding to the event occurring in the process. Herein, wherein the first accordance determination means may be further configured to perform the first accordance determination each time the predetermined time point comes.

Thus, each time the diagnosis code stored in the second memory is duplicated in the third memory, it can be determined whether an anomaly occurs in the second memory.

In such a configuration, “a time point when the diagnosis code stored in the second memory is duplicated in the third memory” may signify, for example, a time point when an information duplication means, if comprised, duplicates information.

Herein, the information duplication means can be defined as follows. It is assumed that the second-memory storing means and the third-memory storing means store a diagnosis code and it is thereafter detected that the diagnosis code stored in the third memory becomes an abnormal value (or stored data are deleted) because of a certain dominant cause, which may be an interruption of a power supply to the third memory temporarily. In such a case, the diagnosis code stored in the second memory is duplicated in the third memory by the information duplication means.

In addition, a time point when the first accordance determination by the first accordance determination means may be designed as any one of the following optional four configurations, for instance.

As an optional configuration, in the above vehicular control apparatus, the first accordance determination means may be further configured to perform the first accordance determination at a time point of an access to the diagnosis code in the third memory in response to a demand from an outside.

As an optional configuration, in the above vehicular control apparatus, the first accordance determination means may be further configured to perform the first accordance determination every cycle ranging from a start to a stop of the control unit.

In addition, the first accordance determination by the first accordance determination means in the configuration may be performed at a time point when the control unit is started, at a time point when a predetermined time period elapses after the start, or at a time point a predetermined time period prior to the stop of the control unit.

As an optional configuration, in the above vehicular control apparatus, the first accordance determination means may be further configured to perform the first accordance determination at a time point of an access to the diagnosis code in the second memory in response to a demand from an outside.

As an optional configuration, in the above vehicular control apparatus, the first accordance determination means may be further configured to perform the first accordance determination at a time point which comes periodically.

In addition, the second accordance determination by the second accordance determination means and the third accordance determination by the third accordance determination means can be performed at any time point and can be performed at a time point similar to the time point at which the first accordance determination by the first accordance determination means.

As another aspect of the disclosure, a program storage medium containing instructions readable and executable by a computer, the instructions for causing the computer to function as all the means included in the above vehicular control apparatus.

The above instructions may be arranged in an order suitable for processing in a computer system and provided as a software program.

It will be obvious to those skilled in the art that various changes may be made in the above-described embodiments of the present invention. However, the scope of the present invention should be determined by the following claims.

What is claimed is:

1. A vehicular control apparatus comprising:
- a first memory of a nonvolatile memory for storing a plurality of diagnosis codes;
- a second memory of a nonvolatile memory in which data are deletable or rewritable;
- a second-memory storing unit for
  - (i) designating, in response to an event occurring in a process in which a predetermined control unit controls an operation of a control target, a diagnosis code among the plurality of diagnosis codes stored in the first memory by referring to the first memory, the designated diagnosis corresponding to the event occurring in the process, and
  - (ii) storing, in the second memory, the diagnosis code designated in the first memory by referring to the first memory;
- a first accordance determination unit for performing a first accordance determination as to whether or not a not-according diagnosis code is present in the second memory, the not-according diagnosis code being stored in the second memory by the second-memory storing unit and not according with any one of the plurality of diagnosis codes stored in the first memory; and
- a second-memory anomaly determination unit for determining that an anomaly occurs in the second memory when the first accordance determination unit determines that the not-according diagnosis code is present in the second memory.

2. The vehicular control apparatus according to claim 1, further using a third memory of a volatile memory for retaining data by receiving a power supply, the vehicular control apparatus further comprising:
- a third-memory storing unit for storing, in the third memory, a diagnosis code among the plurality of diagnosis codes stored in the first memory, in response to an event occurring in the process, the diagnosis code stored in the third memory corresponding to the event occurring in the process; and
- a second accordance determination unit for performing a second accordance determination as to whether or not a not-according diagnosis code related with the third memory is present in the second memory, the not-according diagnosis code related with the third memory being stored in the second memory by the second-memory storing unit and not according with the diagnosis code stored in the third memory,
- wherein when the second accordance determination unit determines that the not-according diagnosis code related with the third memory is present in the second memory, the first accordance determination unit is further configured to perform the first accordance determination.

3. The vehicular control apparatus according to claim 2, wherein
- the first accordance determination unit is further configured to perform the first accordance determination at a time point of an access to the diagnosis code in the third memory in response to a demand from an external tool.

4. The vehicular control apparatus according to claim 1, further comprising:
- a third memory of a volatile memory for retaining data by receiving a power supply, wherein the second memory storing unit stores a diagnosis code, which corresponds to an event occurring in the process, in a storage area of the second memory and a storage area of the third memory corresponding to the storage area of the second memory; and
- a second accordance determination unit for performing a second accordance determination as to whether or not a not-according diagnosis code related with the third memory is present in the storage area of the second memory, the not-according diagnosis code related with the third memory being stored in a storage area of the second memory and not according with a diagnosis code stored in a storage area of the third memory corresponding to the storage area of the second memory,
- wherein when the second accordance determination unit determines that the not-according diagnosis code related with the third memory is present in the storage area of the second memory, the first accordance determination unit is further configured to perform the first accordance determination.

5. The vehicular control apparatus according to claim 1, further comprising
- a third memory of a volatile memory for retaining data by receiving a power supply;

a third-memory storing unit for storing, in the third memory, a diagnosis code among the plurality of diagnosis codes stored in the first memory, at a predetermined time point in response to an event occurring in the process, the diagnosis code corresponding to the event occurring in the process, wherein the first accordance determination unit is further configured to perform the first accordance determination each time the predetermined time point comes.

6. The vehicular control apparatus according to claim 1, wherein the first accordance determination unit is further configured to perform the first accordance determination every cycle ranging from a start to a stop of the control unit.

7. The vehicular control apparatus according to claim 1, wherein the first accordance determination unit is further configured to perform the first accordance determination at a time point of an access to the diagnosis code in the second memory in response to a demand from an external tool.

8. The vehicular control apparatus according to claim 1, wherein the first accordance determination unit is further configured to perform the first accordance determination at a time point which comes periodically.

9. A non-transitory program storage medium containing instructions readable and executable by a computer, the instructions for causing the computer to function as all the units included in the vehicular control apparatus according to claim 1.

10. The vehicular control apparatus according to claim 1, wherein the first accordance determination unit is further configured to perform the first accordance determination at a time point when the vehicular control apparatus starts.

11. The vehicular control apparatus according to claim 1, wherein the first accordance determination unit is further configured to perform the first accordance determination when a specified time period elapses after the vehicular control unit starts.

12. The vehicular control apparatus according to claim 1, wherein the first accordance determination unit is further configured to perform the first accordance determination when the vehicular control unit stops or a specified time point prior to the stop of the vehicular control unit.

* * * * *